(12) United States Patent
Ishikawa et al.

(10) Patent No.: US 8,215,470 B2
(45) Date of Patent: Jul. 10, 2012

(54) STARTING DEVICE

(75) Inventors: Kazunori Ishikawa, Toyota (JP); Koji Maeda, Anjo (JP); Hiroshi Katou, Kariya (JP); Keizo Araki, Anjo (JP); Yuito Abe, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 501 days.

(21) Appl. No.: 12/320,335

(22) Filed: Jan. 23, 2009

(65) Prior Publication Data
US 2009/0242348 A1    Oct. 1, 2009

(30) Foreign Application Priority Data
Mar. 31, 2008    (JP) .................................. 2008-091407

(51) Int. Cl.
*F16D 25/0638* (2006.01)
*F16D 13/74* (2006.01)
*F16H 45/02* (2006.01)

(52) U.S. Cl. ............... 192/85.24; 192/70.12; 192/85.61; 192/113.34; 192/113.5; 192/3.3

(58) Field of Classification Search ............ 192/3.3, 192/70.12, 85.24, 85.61, 113.34, 113.5
See application file for complete search history.

(56) References Cited

U.S. PATENT DOCUMENTS

| 6,332,521 | B1 | 12/2001 | Shoji | |
| 6,431,335 | B1 * | 8/2002 | Kundermann | 192/3.3 |
| 2005/0224308 | A1 * | 10/2005 | Hauck et al. | 192/70.12 |
| 2007/0205067 | A1 * | 9/2007 | Frey et al. | 192/3.3 |

FOREIGN PATENT DOCUMENTS

| FR | 0336843 A1 * | 5/1989 |
| JP | B2-7-65645 | 7/1995 |
| JP | Y2-7-55401 | 12/1995 |
| JP | A-2000-283188 | 10/2000 |
| JP | A-2000-320572 | 11/2000 |
| WO | WO 03/016736 A1 | 2/2003 |

* cited by examiner

*Primary Examiner* — David D Le
*Assistant Examiner* — Jacob S Scott
(74) *Attorney, Agent, or Firm* — Oliff & Berridge, PLC

(57) ABSTRACT

A starting device includes a housing; an output side member; a clutch mechanism; a working oil passage that supplies working oil to a hydraulic chamber of the clutch mechanism from an oil pressure source side; and a lubricating oil passage including a supply oil passage that supplies lubricating oil to the housing from the oil pressure source side and a return oil passage for returning the lubricating oil to the oil pressure source side from the housing, wherein the working oil passage and the lubricating oil passage are formed to overlap at least partially in an axial direction.

24 Claims, 6 Drawing Sheets

REAR ←→ FRONT

STARTING DEVICE

INCORPORATION BY REFERENCE

The disclosure of Japanese Patent Application No. 2008-091407 filed on Mar. 31, 2008 including the specification, drawings and abstract is incorporated herein by reference in its entirety.

BACKGROUND

The present invention relates to a starting device.

In a typical vehicle having an automatic transmission, a starting device is used to ensure that the torque of an engine is transmitted smoothly to a speed change mechanism during start-up. The starting device includes an oil-tight housing (input side member) connected to an output shaft of the engine, and typically, the interior of the housing includes a turbine hub (output side member) that is connected to an input shaft of the speed change mechanism, and also the input shaft is capable of rotating integrally with the turbine hub by inserting the input shaft into the turbine hub and attaching the input shaft to the turbine hub using a spline engagement. The interior of the housing also includes a clutch mechanism that directly couples the turbine hub to the housing by connecting the turbine hub and the housing mechanically through a clutch operation.

The interior of the housing also includes a thrust bearing for restricting axial direction movement of the turbine hub, which is interposed between an inner surface of the housing and axial direction front and rear end surfaces of the turbine hub. Further, an oil passage for supplying lubricating oil to components such as the thrust bearing and clutch mechanism and an oil passage for supplying working oil for switching the clutch mechanism from a disengaged state to an engaged state as required are respectively provided to form an oil passage structure corresponding to the arrangement locations of the various components within the housing.

In a starting device described in International Publication No. WO2003/016736, for example, a working oil passage for supplying working oil discharged by an oil pump to a clutch mechanism is provided with the following oil passage structure. In the starting device described in WO2003/016736, the working oil passage has an oil passage structure including an axial direction oil passage portion drilled in an axial direction from a tip end portion of an input shaft of a speed change mechanism, and a radial direction oil passage portion that extends in at least a radial direction from a tip end (front end) of the axial direction oil passage portion so as to penetrate the interior of a front cover forming a front half portion of a housing outwardly in the radial direction and communicate with a hydraulic chamber of a clutch mechanism portion.

Further, a lubricating oil passage for supplying lubricating oil discharged by the oil pump in a circulatory fashion such that the lubricating oil travels around the arrangement locations of various components such as a thrust bearing and the clutch mechanism is structured by a supply oil passage for supplying the lubricating oil to the interior of the housing from the oil pump side and a return oil passage for returning the lubricating oil to the oil pump side from the interior of the housing. The respective oil passages are provided with the following oil passage structures.

The supply oil passage is structured by an axial direction oil passage portion that extends in the axial direction such that an oil passage portion on an upstream side of a supply direction reaches an axial direction front end surface side of a turbine hub after passing between an outer peripheral surface of the input shaft of the speed change mechanism, and an inner peripheral surface of a sleeve shaft engaged to a cylindrical portion projecting rearward from the turbine hub and an inner peripheral surface of a through hole in which a spline of the turbine hub is formed. The supply oil passage is also structured by a radial direction oil passage portion extending in at least a radial direction such that an oil passage portion on a downstream side of the supply direction supplies the lubricating oil outwardly in the radial direction from the tip end (front end) of the axial direction oil passage portion while lubricating a front side thrust bearing interposed between an inner surface of a front cover and the axial direction front end surface of the turbine hub.

The return oil passage is structured by a radial direction oil passage portion extending in at least the radial direction such that an oil passage portion on an upstream side of a return direction returns the lubricating oil inwardly in the radial direction while lubricating a rear side thrust bearing interposed between an inner surface of a pump cover forming a rear half portion of the housing and an axial direction rear end surface of the turbine hub. The return oil passage is also structured by an axial direction oil passage portion that extends in the axial direction such that an oil passage portion on a downstream side of the return direction passes between an inner peripheral surface of a cylindrical portion projecting rearward from an inner peripheral edge portion of the pump cover, which corresponds to a tip end (inner end) of the radial direction oil passage portion, and an outer peripheral surface of the cylindrical portion projecting rearward from the turbine hub, thereby returning the lubricating oil to an axial direction base end side (rear side) of the oil pump.

SUMMARY

Incidentally, demands have been made in recent years for a reduction in the size of starting devices in order to respond to various needs relating to automatic transmissions. With the starting device described in WO2003/016736, however, the radial direction oil passage portion of the working oil passage, the radial direction oil passage portion of the supply oil passage in the lubricating oil passage, and the radial direction oil passage portion of the return oil passage in the lubricating oil passage respectively occupy individual arrangement spaces away from each other in the axial direction within the interior of the housing, and therefore a problem occurs in that the axial direction length of the device increases.

An object of the present invention is to provide a starting device that can be reduced in size by suppressing an increase in the axial direction length of the device, even when a plurality of oil passages, including oil passage portions that extend respectively in at least a radial direction, are provided. The present invention can also achieve various other advantages.

According to an exemplary aspect of the invention, a starting device includes a housing connected to an output shaft of a drive source; an output side member that has a through hole into which an input shaft of a speed change mechanism can be inserted, the output side member being connected to the input shaft so as to be capable of rotating integrally therewith by inserting the input shaft into the through hole from a tip end portion of the input shaft; a clutch mechanism that directly couples the housing to the output side member such that power can be transmitted therebetween through a clutch operation; a working oil passage that supplies working oil to a hydraulic chamber of the clutch mechanism from an oil pressure source side; and a lubricating oil passage including a supply oil passage that supplies lubricating oil to the housing from the oil pressure source side and a return oil passage for returning the lubricating oil to the oil pressure source side from the housing, wherein the working oil passage and the lubricating oil passage are formed to overlap at least partially in an axial direction.

BRIEF DESCRIPTION OF THE DRAWINGS

Various exemplary aspects of the invention will be described with reference to the drawings, wherein.

DETAILED DESCRIPTION OF EMBODIMENTS

A specific embodiment of a starting device according to the present invention will be described below with reference to FIGS. 1 to 8. Note that in the following description, the term "front-rear direction" denotes a front-rear direction indicated by an arrow in FIG. 1 and so on.

Figure 1:
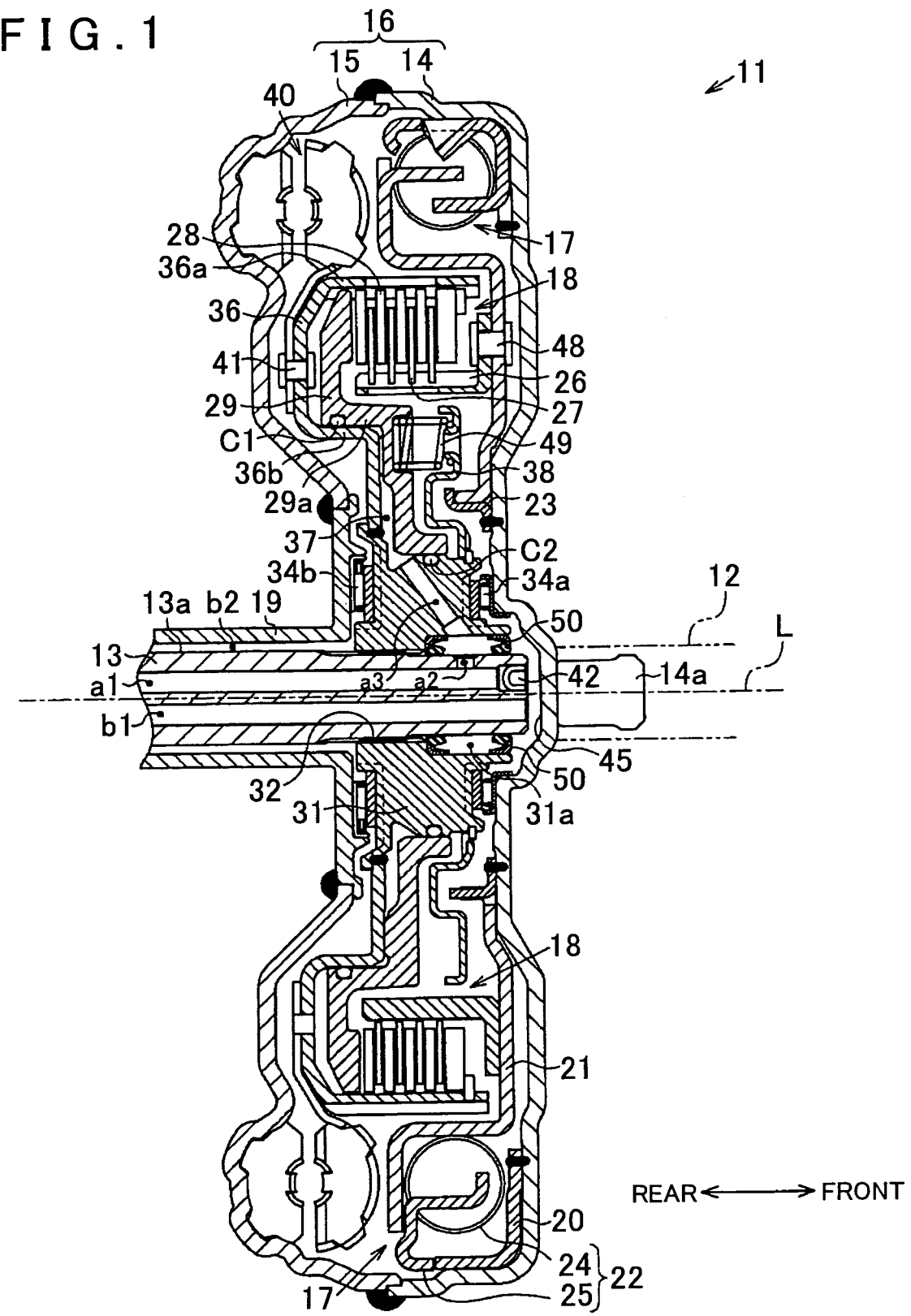
FIG. 1 is a longitudinal sectional view of a starting device according to an embodiment of the present invention.
Figure 2:
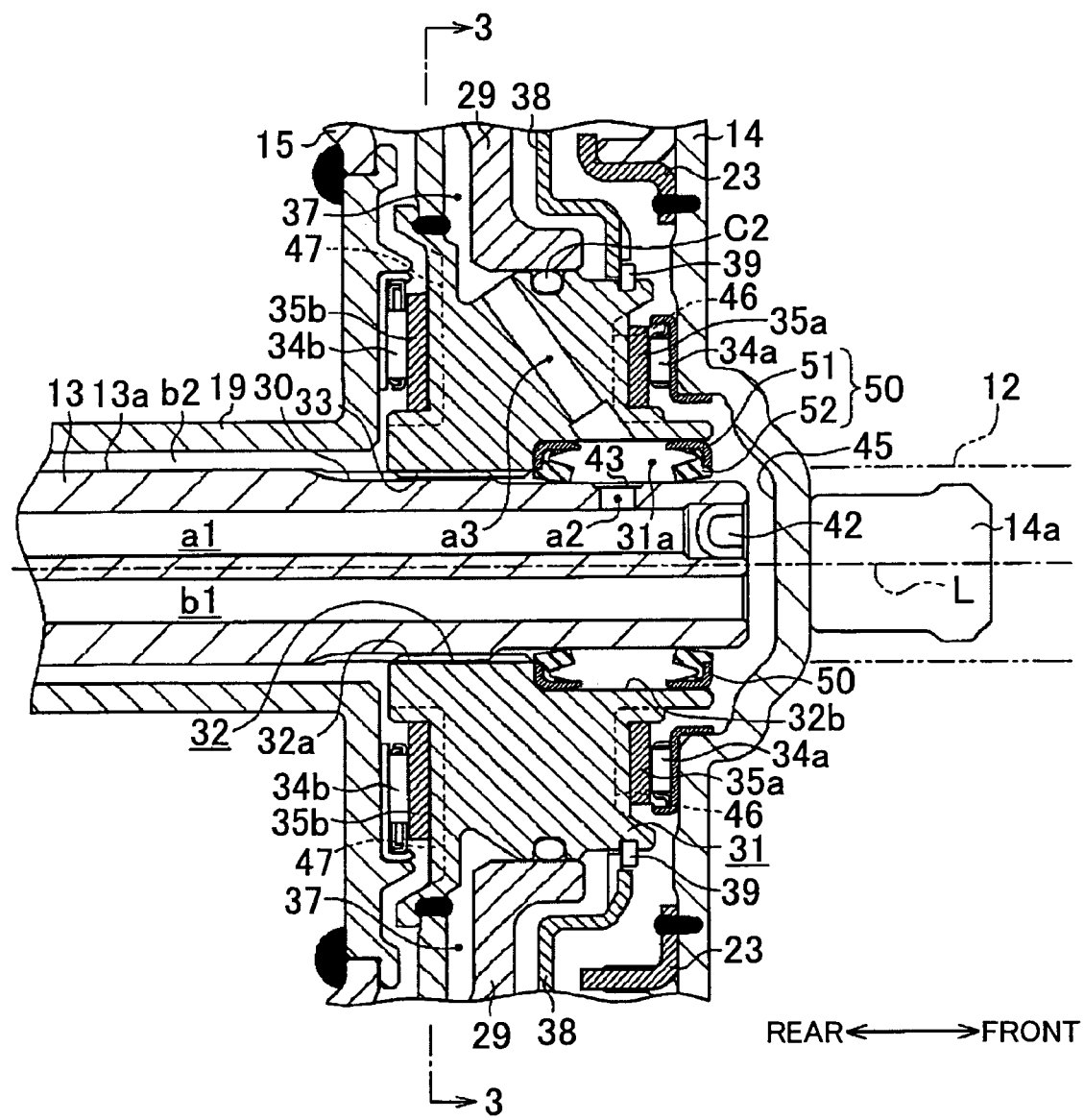
FIG. 2 is an enlarged sectional view showing the main parts of the starting device shown in FIG. 1.

As shown in FIGS. 1 and 2, a starting device 11 is a device for transmitting the torque of an output shaft 12 of an engine serving as a drive source to an input shaft 13 of a speed change mechanism, and includes a housing 16 that serves as an input side member and is structured by a front cover 14 connected to the output shaft 12 of the engine and a pump cover 15 fixed to an outer peripheral side end portion of the front cover 14 by welding. A damper device 17 and a starting clutch 18 that serves as a clutch mechanism are housed in the interior of the housing 16, and automatic transmission fluid (ATF) serving as working oil and lubricating oil is charged into the interior of the housing 16 in an oil-tight manner.

The front cover 14 takes a closed-end, substantially cylindrical form that is closed on a front side and open on a rear side, and by connecting the output shaft 12 of the engine to a connecting portion 14a projecting frontward from a substantially central portion of a bottom wall outer surface (front surface) thereof, the front cover 14 rotates about an axis L of the input shaft 13 of the speed change mechanism on the basis of rotary drive of the output shaft 12 of the engine. The pump cover 15 takes a substantially annular form capable of closing the rear side opening of the front cover 14, and a cylindrical support cover 19 connected to a drive shaft of an oil pump (not shown) serving as an oil pressure source is fixed to a central portion thereof to form a part of the pump cover 15. In other words, the rotation of the output shaft 12 of the engine is transmitted to the oil pump via the front cover 14 and the pump cover 15 (and the support cover 19).

The damper device 17 includes an annular damper plate 20 connected to the engine side, an annular damper disc 21 connected to the speed change mechanism side, and a torque transmitting mechanism 22 for transmitting a rotary force of the damper plate 20 to the damper disc 21. The damper plate 20 is fixed to an outer peripheral side rear surface of the front cover 14 (an inner surface opposing the pump cover 15) so as to rotate integrally with the front cover 14. An inner peripheral edge of the damper disc 21 is engaged with a cylindrical support member 23 fixed to a rear surface of the front cover 14, whereby the damper disc 21 is supported to be free to rotate about the axis L of the input shaft 13 of the speed change mechanism while being restricted from moving in the axial direction. Further, when a relative angle of the damper disc 21 relative to the front cover 14 exceeds a predetermined angle during rotation of the damper disc 21, a predetermined circumferential direction location thereof is latched to a part of an outer peripheral surface of the support member 23, and as a result, further rotation is restricted.

The torque transmitting mechanism 22 is formed by a plurality of damper springs 24, and an intermediate member 25 interposed between the damper springs 24 to connect the springs 24 elastically in series. In each of the damper springs 24, one end contacts the damper plate 20 or the damper disc 21, and the other end contacts the intermediate member 25. By elastically connecting the damper springs 24 and the intermediate member 25 in series, rotary drive transmitted from the output shaft 12 of the engine to the damper plate 20 via the front cover 14 is transmitted to the damper disc 21 via the torque transmitting mechanism 22, which exhibits a damper function. Note that the damper disc 21 is rotationally restricted by being latched to the support member 23 so that a relative angle thereof relative to the front cover 14 does not exceed a predetermined value, and therefore the damper disc 21 does not contract until a spring length of the spring 24 reaches a limit value.

As shown in FIGS. 1 and 2, the input shaft 13 of the speed change mechanism is formed such that a spline 30 serving as an indented engagement-receiving portion aligns with a base end (rear end) side outer peripheral surface 13a in a front-rear direction for a predetermined distance from a tip end (front end). Further, a tapered surface 13b that decreases steadily in diameter toward the tip end side is formed by chamfering a peripheral edge of the tip end surface of the input shaft 13. Further, an axial direction length part of the input shaft 13 of the speed change mechanism extending from the tip end to the formation position of the spline 30 is inserted into and attached to a turbine hub 31 serving as an output side member.

More specifically, the turbine hub 31 is formed in a columnar shape, and a through hole 32 into which the input shaft 13 can be inserted is formed in the axial center thereof. The through hole 32 is formed such that a part thereof extending rearward from an axial direction midway point serves as a small diameter portion 32a having a substantially identical diameter to the diameter of the input shaft 13, and a part thereof extending frontward from the axial direction midway point serves as a large diameter portion 32b having a larger diameter than the small diameter portion 32a. A spline 33 is formed on an inner peripheral surface of the small diameter portion 32a of the through hole 32. The spline 33 serves as a concave-convex engaging portion for engaging the turbine hub 31 and the input shaft 13 to be capable of axial direction movement and incapable of circumferential movement relative to the spline 30 formed on the outer peripheral surface 13a of the input shaft 13.

When the tip end portion of the input shaft 13 is inserted into the through hole 32 in the turbine hub 31 from the rear side, the spline 33 formed on the inner peripheral surface of the small diameter portion 32a of the through hole 32 engages with the spline 30 formed on the input shaft 13 side, thereby connecting the input shaft 13 and the turbine hub 31 for integral rotation. A front-rear pair of oil seals 50 functioning as sealing members are pressed-fitted into the large diameter portion 32b of the through hole 32 formed in the turbine hub 31, into which the tip end portion of the input shaft 13 is inserted. Note that a specific structure relating to the oil seal 50 will be described in detail below.

Further, the turbine hub 31 is connected to the input shaft 13 of the speed change mechanism in a state where annular thrust bearings 34a, 34b capable of bearing a thrust direction load generated during rotation of the turbine hub 31 are disposed on either side of the axial direction. More specifically, a first thrust bearing 34a is interposed between a rear surface (inner surface) of the front cover 14 and an axial direction front end surface of the turbine hub 31, and a second thrust bearing 34b is interposed between a rear end surface of the turbine hub 31 and a front surface (inner surface) of the pump cover 15 (support cover 19). Note that the thrust bearings 34a, 34b are respectively disposed within an annular region located on the outer side of the through hole 32 in the radial direction on each of the front and rear end surfaces of the turbine hub 31. Further, washers 35a, 35b are interposed between the turbine hub 31 and the respective thrust bearings 34a, 34b to increase contact stability therebetween.

As shown in FIG. 1, the starting clutch 18, which can be coupled directly to the output shaft 12 of the engine and the input shaft 13 of the speed change mechanism by a clutch operation, is disposed on a back surface (rear surface) side of the damper device 17. The starting clutch 18 includes a tubular clutch hub 26 that extends rearward when engaged to the inner peripheral side of the damper disc 21 by a pin 48, and a plurality of (four in this embodiment) inside frictional engagement plates 27 are spline-engaged to an outer peripheral side of the clutch hub 26 to be free to move in the front-rear direction. Further, a bottom portion inner peripheral edge of a closed-end, substantially cylindrical clutch drum 36 having an open front side is fixed to a rear end outer peripheral portion of the turbine hub 31, and a plurality of (four in this embodiment) outside frictional engagement plates 28 are spline-engaged to an inner peripheral side of an outer peripheral side tube portion 36a of the clutch drum 36 so as to be positioned alternately with the inside frictional engagement plates 27 in the front-rear direction and free to move in the front-rear direction.

An annular piston 29 is supported on the peripheral surface of the turbine hub 31 to be free to move relative to the turbine hub 31 in the axial direction by fitting an inner peripheral edge thereof slidably onto the peripheral surface of the turbine hub 31. The piston 29 is formed such that an axial direction cross-section thereof is crank-shaped, and an outer peripheral surface of a midway tube portion 29a thereof, which is bent into a crank shape, engages slidably with an outer peripheral surface of an inner peripheral side tube portion 36b of the clutch drum 36. O-rings C1, C2 are disposed between the midway tube portion 29a of the piston 29 and the inner peripheral side tube portion 36b of the clutch drum 36 and between the inner peripheral edge of the piston 29 and the peripheral surface of the turbine hub 31, respectively, and by a sealing function of the O-rings C1, C2, a hydraulic chamber 37 is formed on a back surface (rear surface) side of the piston 29.

Further, an annular cancel plate 38 is supported on the front end outer peripheral portion of the turbine hub 31 in a position further toward the axial direction front side than the piston 29 so as to be movement-restricted by a snap ring 39. A return spring 49 is disposed between the cancel plate 38 and the piston 29, and the piston 29 is biased in a direction approaching the clutch drum 36 (a direction heading away from the respective frictional engagement plates 27, 28) at all times by the biasing force of the return spring 49.

More specifically, an engagement state of the starting clutch 18 is realized when the piston 29 moves forward against the biasing force of the return spring 49 due to an increase in the oil pressure of the ATF in the hydraulic chamber 37 such that the outside frictional engagement plates 28 are pushed against the inside frictional engagement plates 27. On the other hand, a disengagement state of the starting clutch 18 is realized when the piston 29 moves rearward in accordance with the biasing force of the return spring 49 due to a reduction in the oil pressure of the ATF in the hydraulic chamber 37 such that the outside frictional engagement plates 28 separate from the inside frictional engagement plates 27.

Further, a fluid coupling 40 that does not exhibit a torque amplifying action is disposed within the housing 16 in a position corresponding to an outer peripheral side front surface of the pump cover 15 (the inner surface opposing the front cover 14) in order to absorb a rotational difference between the pump cover 15 and the clutch drum 36 during start-up or a shift. Note that in the fluid coupling 40, one of two vane members forming a pair is fixed to the pump cover 15, and the other vane member is caulked fixedly to the clutch drum 36 by a rivet 41.

Next, the structure of a working oil passage for supplying ATF to the hydraulic chamber 37 as working oil will be described in detail.

Figure 3:
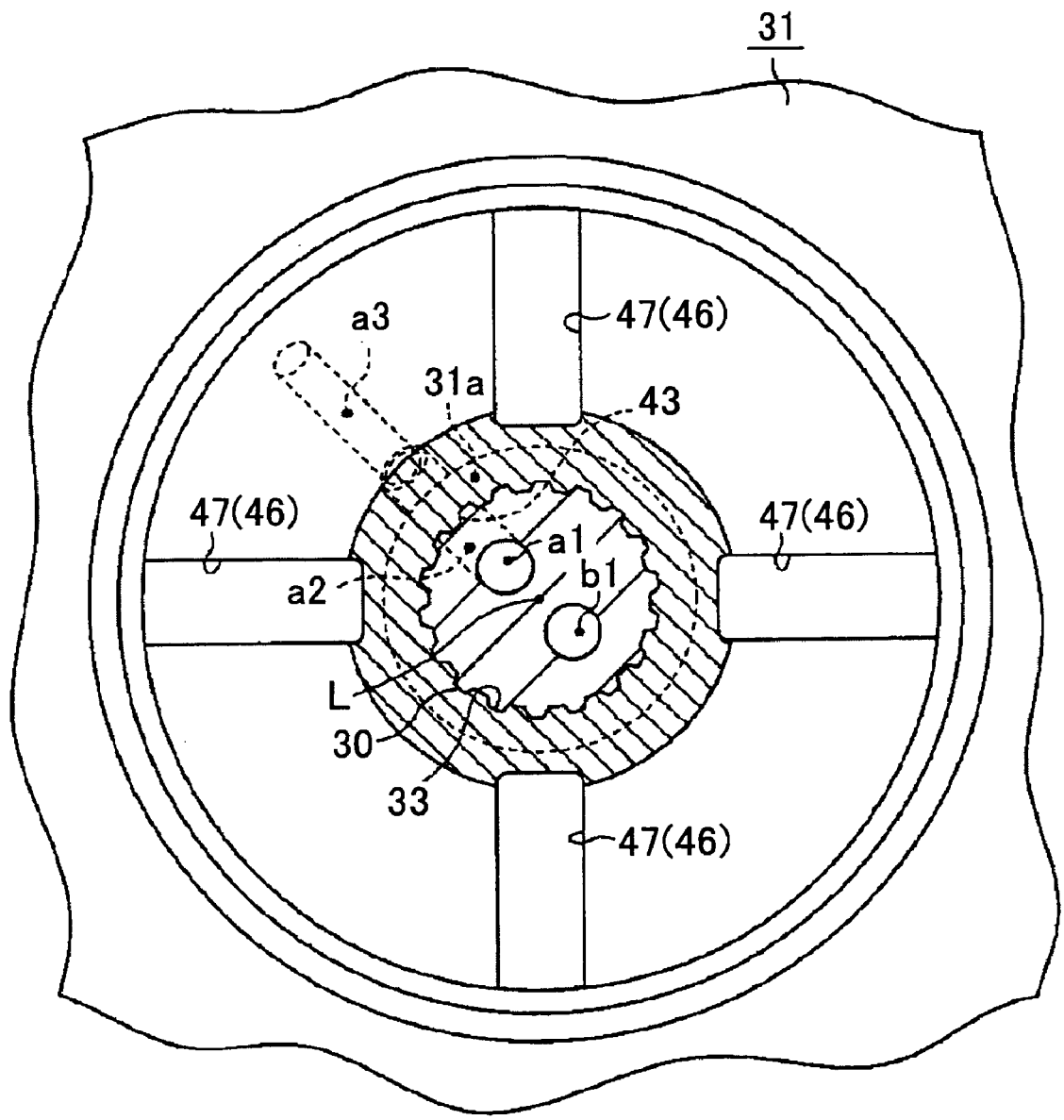
FIG. 3 is a partial sectional view seen from an arrow 3-3 in FIG. 2.

As shown in FIGS. 1 to 3, a first working oil passage a1 communicating with an oil pump is formed in the input shaft 13 of the speed change mechanism in an axial direction, and a tip end opening of the first working oil passage a1 is closed by a plug member 42. In a lengthwise direction of the first working oil passage a1, a second working oil passage a2 curves from a position corresponding to the large diameter portion 32b of the through hole 32 in the turbine hub 31, i.e. a position further toward the tip end side of the input shaft 13 than the formation position of the spline 30, so as to extend outward in the radial direction such that an oil hole 43 opens onto the outer peripheral surface 13a of the input shaft 13. Through the oil hole 43 opening onto the outer peripheral surface 13a of the input shaft 13, the second working oil passage a2 communicates with an oil reservoir chamber 31a formed in the large diameter portion 32b of the through hole 32 in the turbine hub 31 by the front-rear pair of oil seals 50.

Further, a third working oil passage a3 that penetrates the interior of the turbine hub 31 outwardly in the radial direction from the inner peripheral surface of the large diameter portion 32b of the through hole 32 is formed in the turbine hub 31 in a diagonal linear shape so as to communicate with the hydraulic chamber 37. Together, the first working oil passage a1, the second working oil passage a2, the oil reservoir chamber 31a, and the third working oil passage a3 form a working oil passage for supplying ATF as working oil to the hydraulic chamber 37 during a clutch operation. Note that in this embodiment, the first working oil passage a1 forms an axial direction oil passage portion extending in the axial direction, while the second working oil passage a2, the oil reservoir chamber 31a, and the third working oil passage a3 form a radial direction oil passage portion extending in at least the radial direction.

Next, the structure of a lubricating oil passage for circulating and supplying ATF as lubricating oil to the interior of the housing 16 will be described in detail.

As shown in FIGS. 1 to 3, a first lubricating oil passage b1 communicating with the oil pump is formed in the input shaft 13 of the speed change mechanism in the axial direction parallel to the first working oil passage a1 of the working oil passage. A tip end of the first lubricating oil passage b1 opens onto the tip end (front end) surface of the input shaft 13, and the first lubricating oil passage b1 communicates with an oil passage formation recess portion 45, which is formed in a substantially central portion of a base wall inner surface (rear surface) of the front cover 14, via the tip end opening therein.

Further, as shown in FIGS. 1 to 3, a plurality of oil grooves 46, 47 (four of each in this embodiment) extending in a radial direction orthogonal to the axis L of the input shaft 13 are formed respectively in the axial direction front and rear end surfaces of the turbine hub 31 in positions corresponding to the thrust bearings 34a, 34b in the radial direction. The oil grooves 46, 47 are formed at equiangular intervals (90-degree intervals) in a circumferential direction centering on the axis L of the input shaft 13 of the speed change mechanism so as to deviate from the second and third working oil passages a2, a3 of the working oil passage in the circumferential direction. Together, the first lubricating oil passage b1, the oil passage formation recess portion 45, and the front end surface side oil grooves 46 form a supply oil passage for supplying lubricating oil from the oil pump side to locations (the starting clutch 18 and so on, for example) of the housing 16 requiring lubrication.

Further, a second lubricating oil passage b2 communicating with the oil pump is formed between the outer peripheral surface 13a of the input shaft 13 of the speed change mechanism and the inner peripheral surface of the support cover 19 on the pump cover 15 so as to communicate with a radial direction inner side of the rear end surface side oil grooves 47. Together, the second lubricating oil passage b2 and the rear end surface side oil grooves 47 form a return oil passage for returning the lubricating oil supplied via the supply oil passage to the locations (the starting clutch 18 and so on, for example) of the housing 16 requiring lubrication to the oil pump side.

In this embodiment, the supply oil passage formed by the first lubricating oil passage b1, the oil passage formation recess portion 45, and the front end surface side oil grooves 46 and the return oil passage formed by the second lubricating oil passage b2 and the rear end surface side oil grooves 47 together form a lubricating oil passage for circulating and supplying ATF to the housing 16 as lubricating oil. Note that in this embodiment, the first lubricating oil passage b1 and the second lubricating oil passage b2 form an axial direction oil passage portion extending in the axial direction, while the oil passage formation recess portion 45 and the oil grooves 46, 47 form a radial direction oil passage portion extending in at least the radial direction.

As shown in FIGS. 1 and 2, of the oil grooves 46, 47 forming a part of the radial direction oil passage portion, the front end surface side oil grooves 46 are formed such that respective arrangement spaces thereof overlap the second working oil passage a2 and a radial direction inner side site of the third working oil passage a3, which form a part of the radial direction oil passage portion of the working oil passage, in the axial direction of the input shaft 13. In other words, in an identical or nearby position in the axial direction of the input shaft 13, the oil grooves 46, the second working oil passage a2, and the radial direction inner side site of the third working oil passage a3 are formed in the radial direction so as to overlap partially in the axial direction of the input shaft 13.

The third working oil passage a3 forming a part of the radial direction oil passage portion of the working oil passage takes a linear oil passage structure inclined toward a base end side in an extension direction thereof such that a radial direction outer side site thereof is further away from the oil grooves 46 forming a part of the lubricating oil passage in the axial direction of the input shaft 13 than the radial direction inner side site (and the second working oil passage a2).

Next, the structure of the oil seal 50 interposed between the inner peripheral surface of the through hole 32 (large diameter portion 32b) in the turbine hub 31 and the outer peripheral surface 13a of the input shaft 13 of the speed change mechanism will be described in detail.

Figure 4:
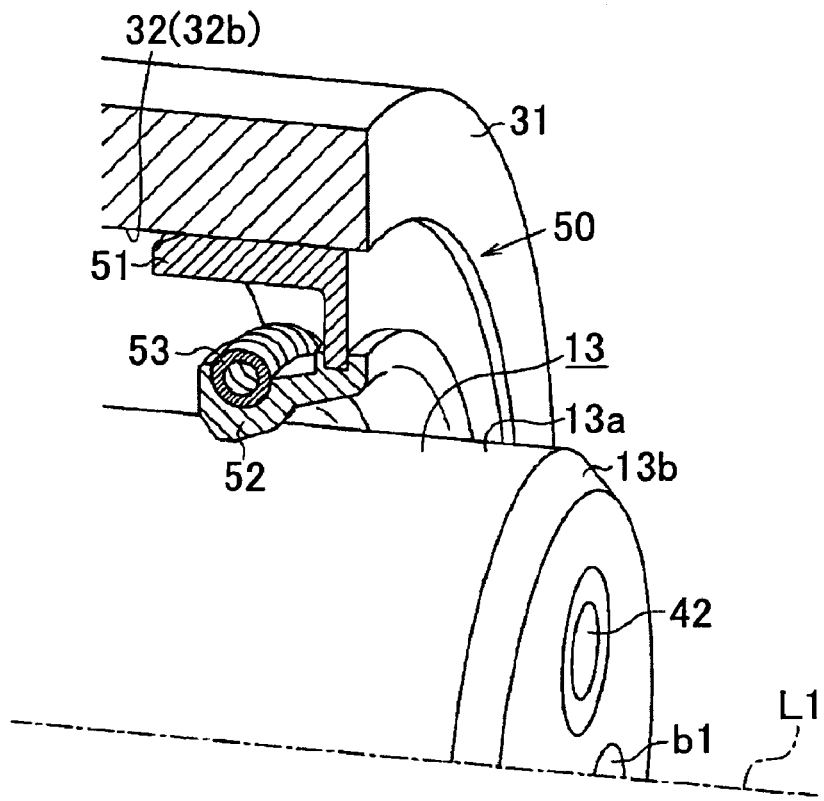
FIG. 4 is a perspective view showing an oil seal attachment state of this embodiment.

As shown in FIG. 4, the oil seal 50 includes an annular fitting member 51 fitted into the large diameter portion 32b of the through hole 32 in the turbine hub 31, and an annular seal lip 52 fixed to the fitting member 51 by a radial direction outside part forming an outer peripheral side thereof. The oil seal 50 also includes an annular spring member 53 serving as a biasing member for biasing a radial direction inside part forming an inner peripheral side of the seal lip 52 against the outer peripheral surface 13a of the input shaft 13.

The fitting member 51 is formed by a rigid material such as a metal, and has an L-shaped cross-section in the axial direction. Further, the fitting member 51 is formed such that an outer diameter thereof is slightly larger than an inner diameter of the large diameter portion 32b of the through hole 32 such that when the fitting member 51 is fitted into the large diameter portion 32b of the through hole 32, the outside surface of the fitting member 51 is pressed against the inner peripheral surface of the large diameter portion 32b. Further, a site of the radial direction inside part of the seal lip 52 that slidingly contacts the outer peripheral surface of the input shaft 13 is formed with a curved surface, and the spring member 53 is fitted onto the outer peripheral surface of the part formed with this curved surface. By the spring member 53, the curved surface of the seal lip 52 is biased to the radial direction inner side so as to slidingly contact the outer peripheral surface 13a of the input shaft 13 of the speed change mechanism, and on the basis of the sliding contact between the curved surface and the outer peripheral surface of the input shaft 13, the radial direction inside part of the seal lip 52 is lifted onto the outer peripheral surface. Note that an elastic material applied to the seal lip 52 is preferably selected appropriately in consideration of the type, wear resistance, water resistance, and so on of the oil to be sealed.

Next, actions of the starting device 11 described above will be described in accordance with FIGS. 5 to 8.

First, an attachment process for connecting the input shaft 13 of the speed change mechanism to the turbine hub 31 to enable relative rotation therebetween, which is performed during a manufacturing process of the starting device 11, will be described. Note that in FIGS. 5 to 8, other members (the piston 29 and so on) housed in the housing 16 together with the turbine hub 31, and also the housing 16, have been omitted to simplify the content of the drawings.

Figure 5:
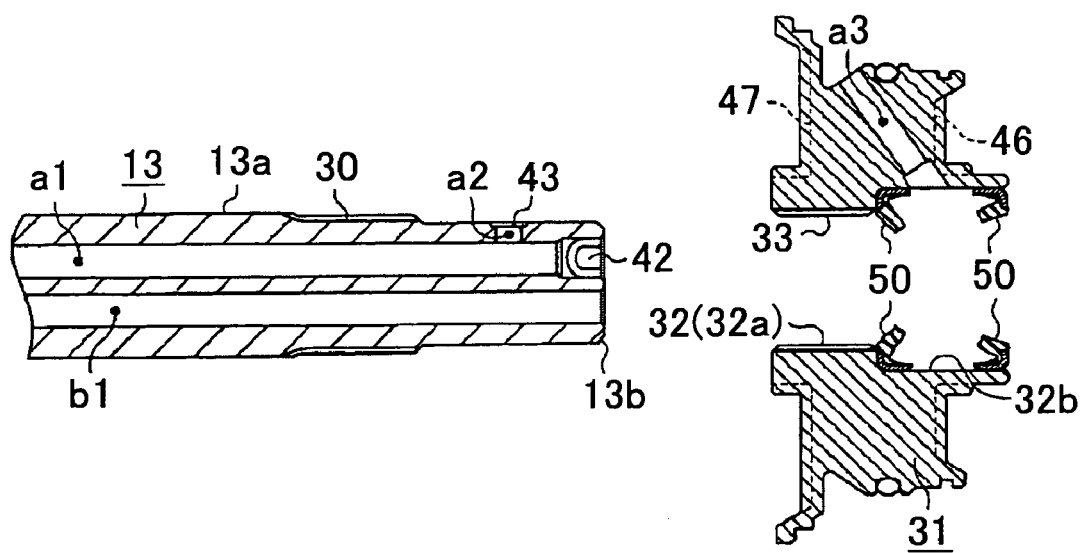
FIG. 5 is a longitudinal sectional view illustrating a process for attaching an input shaft of a speed change mechanism to a turbine hub.

In this attachment process, the input shaft 13 of the speed change mechanism is inserted into the through hole 32 in the turbine hub 31 from the tip end side and thereby attached to the turbine hub 31. At a prior stage, however, the pair of oil seals 50 are attached to the interior of the large diameter portion 32b of the through hole 32 in the turbine hub 31 in advance, as shown in FIG. 5. More specifically, one oil seal 50 is fitted into a backmost portion of the large diameter portion 32b, and the other oil seal 50 is fitted into an opening portion of the large diameter portion 32b.

Note that when the oil seals 50 are fitted into the large diameter portion 32b, each oil seal 50 is pressed against the inner peripheral surface of the large diameter portion 32b by an outside surface of the annular fitting member 51. Therefore, the oil seals 50 are positioned in and attached to the respective attachment positions (the backmost portion and the opening portion) while being restricted from moving in the axial direction. In other words, the outside surface of the fitting member 51 is pressed against the inner peripheral surface of the large diameter portion 32b of the through hole 32 and the outer peripheral surface 13a of the input shaft 13 in accordance with elastic deformation of the seal lip 52, and therefore the oil seal 50 is positioned and attached while being restricted from moving in the axial direction, without forming an annular recessed groove in the outer peripheral surface 13a of the input shaft 13.

Figure 6:
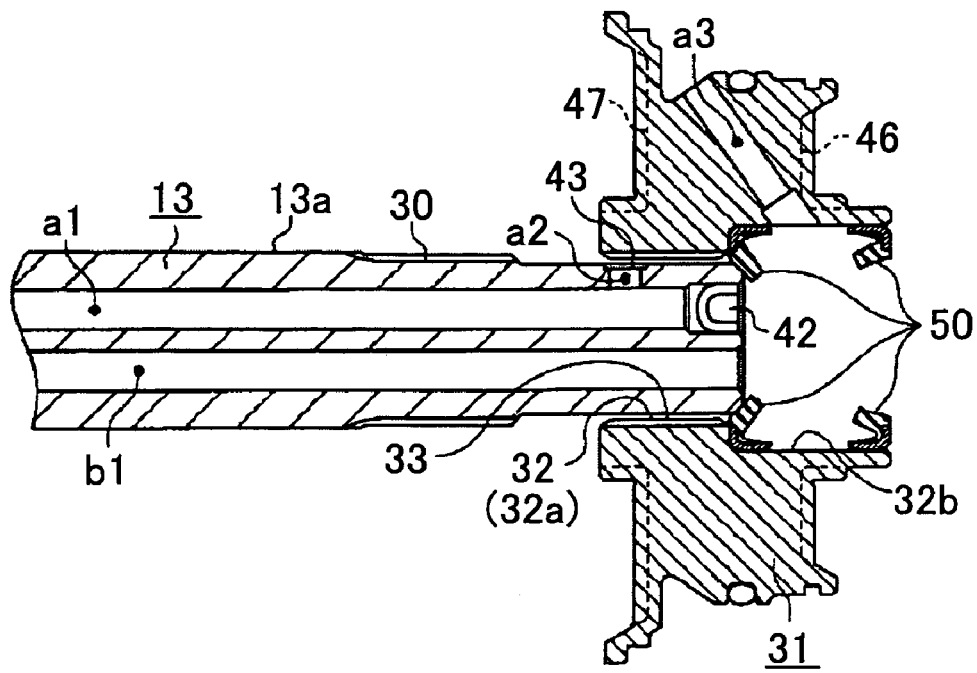
FIG. 6 is a longitudinal sectional view illustrating a process for attaching the input shaft of the speed change mechanism to the turbine hub.

Then, when the input shaft 13 is inserted from the tip end side into the small diameter portion 32a of the through hole 32 in the turbine hub 31 to which the oil seals 50 are attached, the input shaft 13 contacts the seal lip 52 of the oil seal 50 attached to the backmost portion of the large diameter portion 32b at the point where the tip end thereof passes the small diameter portion 32a of the through hole 32, as shown in FIG. 6. At this time, the inclined tapered surface 13b is formed by chamfering the peripheral edge of the tip end surface of the input shaft 13. Meanwhile, the radial direction inside part of the seal lip 52, which hangs inwardly in the radial direction, curves outwardly in the radial direction.

Hence, the seal lip 52 of the backmost portion oil seal 50 tilts as the curved surface of the radial direction inside part thereof slides smoothly over the tapered surface 13b on the tip end of the input shaft 13. In other words, the tip end of the input shaft 13 does not catch on the radial direction inside part of the seal lip 52. When the input shaft 13 is inserted further toward the front side in the insertion direction, the seal lip 52 of the backmost portion oil seal 50 is elastically deformed so as to slidingly contact the outer peripheral surface 13a of the input shaft 13 while being pressed against the outer peripheral surface 13a by the biasing force of the spring member 53.

Figure 7:
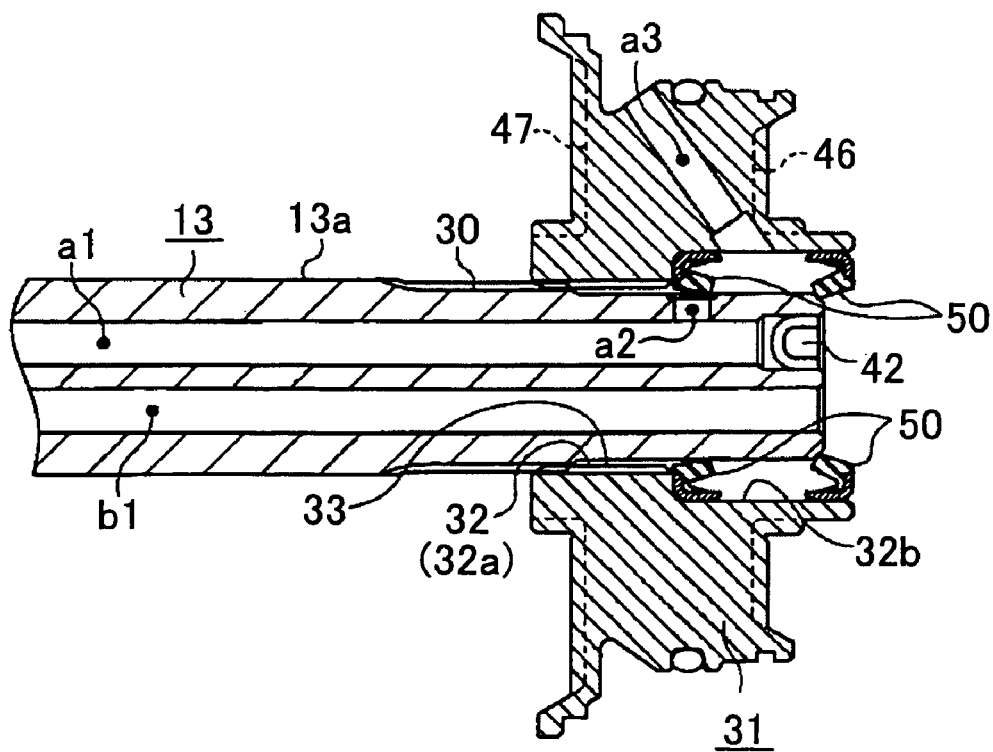
FIG. 7 is a longitudinal sectional view illustrating a process for attaching the input shaft of the speed change mechanism to the turbine hub.

As shown in FIG. 7, when the input shaft 13 is inserted further toward the front side in the insertion direction, the spline 30 formed on the outer peripheral surface of the input shaft 13 engages with the spline 33 formed on the inner peripheral surface of the small diameter portion 32a of the through hole 32. When the input shaft 13 is pushed further toward the front side in the insertion direction while maintaining the state of engagement between the splines 30, 33, the tip end of the input shaft 13 contacts the seal lip 52 of the oil seal 50 attached to the opening portion of the large diameter portion 32b of the through hole 32. As a result, the seal lip 52 of the opening portion oil seal 50 tilts as the curved surface of the radial direction inside part thereof slides smoothly over the tapered surface 13b on the tip end of the input shaft 13, similarly to the seal lip 52 of the backmost portion oil seal 50. Finally, as shown in FIG. 8, the seal lip 52 is elastically deformed so as to slidingly contact the outer peripheral surface 13a of the input shaft 13 while being pressed by a greater pressing force against the outer peripheral surface 13a by the biasing force of the spring member 53.

In this case, the spline 30 formed on the outer peripheral surface 13a of the input shaft 13 engages with the spline 33 of the small diameter portion 32a as the input shaft 13 is inserted into the through hole 32, and thereafter, the input shaft 13 does not advance further toward the front side in the insertion direction (i.e. into the large diameter portion 32b of the through hole 32). Hence, the spline 30 on the input shaft 13 side does not contact the seal lip 52 of the oil seal 50 attached to the backmost portion of the large diameter portion 32b of the through hole 32, and the seal lip 52 is not damaged by contact with the spline 30.

Figure 8:
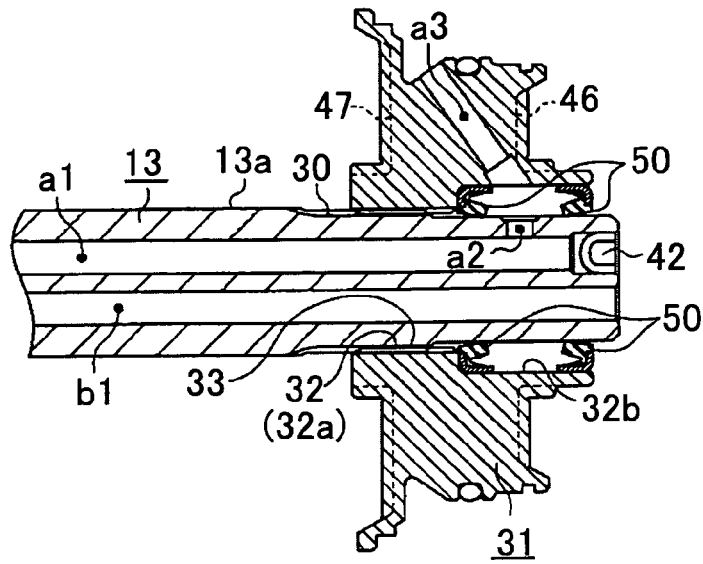
FIG. 8 is a longitudinal sectional view illustrating a process for attaching the input shaft of the speed change mechanism to the turbine hub.

When the state shown in FIG. 8 is established, relative movement between the input shaft 13 and the turbine hub 31 in the circumferential direction is made impossible by the engagement between the splines 30, 33, and thus the input shaft 13 and turbine hub 31 are connected to be capable of integral rotation. The oil hole 43 in the second working oil passage a2 opening onto the outer peripheral surface 13a on the tip end side of the input shaft 13 is thus positioned in a substantially central axial direction portion of the large diameter portion 32b of the through hole 32 in the turbine hub 31. Further, the front-rear pair of oil seals 50 fitted between the outer peripheral surface 13a of the input shaft 13 and the inner peripheral surface of the large diameter portion 32b of the through hole 32 are disposed so as to sandwich the oil hole 43 opening onto the outer peripheral surface 13a of the input shaft 13 from either side of the axial direction such that the oil reservoir chamber 31a is formed between the two oil seals 50. Thus, the attachment process for connecting the input shaft 13 of the speed change mechanism and the turbine hub 31 to be capable of integral rotation is complete.

When the output shaft 12 on the engine side and the input shaft 13 of the speed change mechanism are directly coupled during use of the starting device 11 following completion of the attachment process described above, the ATF is supplied as working oil from the oil pump side into the hydraulic chamber 37 through the first working oil passage a1, the second working oil passage a2, the oil reservoir chamber 31a, and the third working oil passage a3. As a result, the piston 29 moves in a direction for pressing the outside frictional engagement plates 28 against the inside frictional engagement plates 27 as the oil pressure in the hydraulic chamber 37 rises, whereby the starting clutch 18 shifts from a disengaged state to an engaged state.

In this case, when the ATF discharged into the oil reservoir chamber 31a from the oil hole 43 in the second working oil passage a2 attempts to leak in the axial direction along the outer peripheral surface 13a of the input shaft 13, this leakage of the ATF is restricted by the sealing function of the pair of oil seals 50 attached so as to sandwich the oil hole 43 from the front and rear sides of the axial direction. Furthermore, the ATF restricted from leaking in the axial direction is supplied quickly to the hydraulic chamber 37 via the third working oil passage a3, which is inclined in a straight line toward the hydraulic chamber 37.

Further, when the ATF is circulated through and supplied to the housing 16, in which the starting clutch 18 switches repeatedly between the engaged state and the disengaged state, as lubricating oil, the ATF is supplied from the oil pump side to the arrangement location of the starting clutch 18 and so on through the first lubricating oil passage b1, the oil passage formation recess portion 45, and the front end surface side oil grooves 46, and returned to the oil pump side from the housing 16 through the rear end surface side oil grooves 47 and the second lubricating oil passage b2. In particular, when the ATF is supplied to the housing 16, the ATF is supplied to the starting clutch 18 side as lubricating oil while lubricating the thrust bearing 34a through the front end surface side oil grooves 46, the arrangement spaces of which overlap the second working oil passage a2 (and the radial direction inner side site of the third working oil passage a3) in the axial direction.

According to this embodiment, the following effects can be obtained.

(1) In this embodiment, the oil seals 50 are used as sealing members for restricting leakage of the ATF in the axial direction through the oil hole 43 opening onto the outer peripheral surface 13*a* of the input shaft 13. Further, the outside surface of the fitting member 51 presses against the inner peripheral surface of the large diameter portion 32*b* of the through hole 32 in the turbine hub 31, and the radial direction inside part of the seal lip 52 is elastically deformed so as to press against the outer peripheral surface 13*a* of the input shaft 13, and therefore the oil seals 50 are incapable of axial direction movement. Hence, the need to provide an annular recessed groove for attaching a sealing member to be incapable of axial direction movement in the outer peripheral surface 13*a* of the input shaft 13 of the speed change mechanism is eliminated. As a result, there is no need to secure an arrangement space for the recessed groove on the input shaft 13, enabling a corresponding reduction in the size of the starting device 11, and moreover, axial direction leakage of the oil supplied through the oil passage including the oil hole 43 that opens onto the outer peripheral surface 13*a* of the input shaft 13 of the speed change mechanism can be restricted favorably.

(2) Further, the radial direction inside part of the seal lip 52 is biased toward the outer peripheral surface 13*a* of the input shaft 13 by the spring member 53, and therefore the oil seal 50 is pressed against the outer peripheral surface 13*a* of the input shaft 13 by a strong pressing force obtained by adding the biasing force of the spring member 53 to the elastic force of the seal lip 52 itself. As a result, the sealing function of the oil seal 50 can be reinforced by the spring member 53.

(3) In the embodiment described above, the spline 30 on the input shaft 13 side is formed in a position further toward the base end side of the input shaft 13 than the arrangement position of the oil seal 50 on the outer peripheral surface 13*a* of the input shaft 13. Therefore, when the input shaft 13 is attached to the turbine hub 31, the spline 30 on the input shaft 13 side does not contact the seal lip 52 of the oil seal 50 fitted into the large diameter portion 32*b* of the through hole 32 in the turbine hub 31. Hence, during the attachment process of the input shaft 13, the spline 30 of the input shaft 13 can be prevented from damaging the seal lip 52 of the oil seal 50.

(4) In the embodiment described above, the peripheral edge of the tip end surface of the input shaft 13 is chamfered to form the tapered surface 13*b* that decreases in diameter toward the tip end side. Hence, when the input shaft 13 is attached to the turbine hub 31, the curved surface on the radial direction inside part of the seal lip 52 of the oil seal 50 tilts while sliding smoothly over the tapered surface 13*b* on the tip end of the input shaft 13. As a result, the radial direction inside part of the seal lip 52 of the oil seal 50 does not catch on the tip end of the input shaft 13 during the attachment process of the input shaft 13, and the operation to attach the input shaft 13 to the turbine hub 31 can be performed smoothly.

(5) In the embodiment described above, the radial direction inside part of the seal lip 52 of the oil seal 50 curves outwardly in the radial direction. Hence, when the input shaft 13 is attached to the turbine hub 31, the curved surface formed on the radial direction inside part of the seal lip 52 slides smoothly from the tip end of the input shaft 13 over the outer peripheral surface 13*a*. As a result, the input shaft 13 does not catch on the seal lip 52 during the attachment process of the input shaft 13, and the operation to attach the input shaft 13 to the turbine hub 31 can be performed smoothly.

(6) In the embodiment described above, the oil grooves 46 forming a part of the radial direction oil passage portion of the lubricating oil passage and the second working oil passage a2 and the radial direction inner side site of the third working oil passage a3 forming a part of the radial direction oil passage portion of the working oil passage are formed such that the respective arrangement spaces thereof overlap in the axial direction. Hence, in the starting device 11, the overall axial length of the device can be shortened by an amount corresponding to the overlap. As a result, even when an oil passage structure including a radial direction oil passage portion in which a plurality of oil passages, namely the working oil passage and the lubricating oil passage, respectively extend in at least the radial direction is provided, an increase in axial direction length can be suppressed, making it possible to respond to a demand for a reduction in the size of the starting device 11.

(7) In the embodiment described above, the oil grooves 46 of the lubricating oil passage and the second working oil passage a2 and the radial direction inner side site of the third working oil passage a3 of the working oil passage extend such that the respective radial direction outer side parts thereof are away from each other in the circumferential direction centering on the axis L of the input shaft 13. Hence, an oil passage structure in which the arrangement spaces of the radial direction oil passage portions of the respective oil passages overlap partially in the axial direction can be realized easily.

(8) In the embodiment described above, the oil grooves 46 of the lubricating oil passage are disposed further toward the outside of the radial direction than the radial direction inside site of the third working oil passage a3 of the working oil passage, and therefore an oil passage structure in which the disposal spaces of oil passages overlap in the axial direction can be realized easily.

(9) In the embodiment described above, the thrust bearings 34*a*, 34*b* are disposed between the axial direction end surface of the turbine hub 31 and the inner surface of the housing 16, and therefore a concern arises in that the overall axial length of the starting device 11 increases by an amount corresponding to the axial direction thickness of the thrust bearings 34*a*, 34*b*. However, in the oil passage structure of the embodiment described above, the oil grooves 46 provided in the lubricating oil passage to lubricate the front end surface side thrust bearing 34*a* partially overlap the second working oil passage a2 and the radial direction inner side site of the third working oil passage a3 forming a part of the radial direction oil passage portion of the working oil passage in the axial direction, thereby achieving a reduction in axial length, and as a result, this concern can be dealt with satisfactorily.

(10) In the embodiment described above, the position in which the second working oil passage a2 forming the radial direction oil passage portion of the working oil passage curves outwardly in the radial direction from the first working oil passage a1 forming the axial direction oil passage portion is away from the hydraulic chamber 37 of the starting clutch 18 in the axial direction. However, the third working oil passage a3 that communicates with the second working oil passage a2 via the oil reservoir chamber 31*a* penetrates the interior of the turbine hub 31 in a linear incline toward the hydraulic chamber 37, and therefore the ATF can be supplied to the hydraulic chamber 37 quickly.

(11) In the embodiment described above, the third working oil passage a3 forming a part of the radial direction oil passage portion of the working oil passage is formed in the turbine hub 31, which is connected to the input shaft 13 to be capable of rotating integrally therewith. Hence, the inner diameter side opening of the third working oil passage a3 in the turbine hub 31 always opposes the oil hole 43 formed in the outer peripheral surface part of the input shaft 13 in the radial direction. As a result, the pressure of the working oil supplied through the first working oil passage a1 can be supplied to the starting clutch 18 through the third working oil passage a3 with a high degree of responsiveness.

Note that the embodiment described above may be modified in the following ways.

Figure 9:
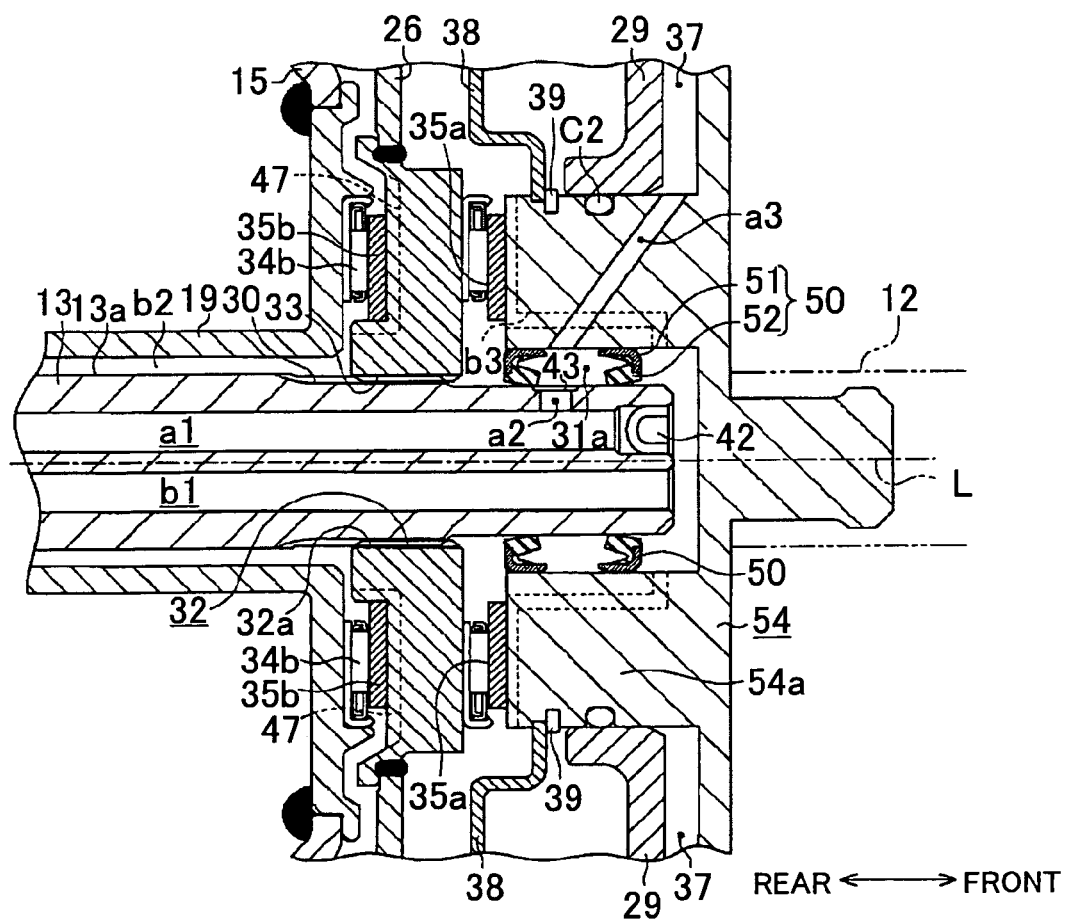
FIG. 9 is an enlarged sectional view showing the main parts of a starting device according to another embodiment.

As shown in FIG. 9, the radial direction oil passage portion of the working oil passage and the radial direction oil passage portion of the lubricating oil passage may be formed in a center piece 54 provided in a substantially central portion of the front cover 14. More specifically, the third working oil passage a3, which penetrates the center piece 54 outwardly in the radial direction from an inner peripheral surface of a cylindrical hub portion 54a of the center piece 54 is formed at a linear incline so as to communicate with the hydraulic chamber 37. Further, a third lubricating oil passage b3 is formed by an oil passage penetrating the center piece 54 toward a rear end surface of the hub portion 54a of the center piece 54 from the inner peripheral surface of the hub portion 54a, and an oil groove extending outwardly in the radial direction on the rear end surface of the hub portion 54a of the center piece 54. Note that the third working oil passage a3 is formed such that the third lubricating oil passage b3 deviates therefrom in the circumferential direction centering on the axis L of the input shaft 13.

In the embodiment described above, the radial direction inside part of the seal lip 52 of the oil seal 50 does not necessarily have to curve outwardly in the radial direction, and may be formed in a straight line. Note that in this case, the radial direction inside part of the seal lip 52 is preferably disposed at an incline relative to the axial direction.

In the embodiment described above, chamfering does not have to be implemented on the peripheral edge of the tip end surface of the input shaft 13.

In the embodiment described above, the spring member 53 for biasing the oil seal 50 such that the radial direction inside part of the seal lip 52 is pressed against the outer peripheral surface 13a of the input shaft 13 may be omitted. In this case, the radial direction inside part of the seal lip 52 may be elastically deformed so as to be pressed against the outer peripheral surface 13a of the input shaft 13 by the elastic force of the seal lip 52 itself.

In the embodiment described above, as long as the oil seals 50 are disposed in the large diameter portion 32b of the through hole 32 in the turbine hub 31 so as to sandwich the oil hole 43 opening onto the outer peripheral surface 13a of the input shaft 13 from either side of the axial direction, they are not limited to a front-rear pair, and three or more oil seals 50 may be provided.

In the embodiment described above, the second working oil passage a2 and the third working oil passage a3 forming the radial direction oil passage portion of the working oil passage may be formed in a bent form or a curved form.

In the embodiment described above, the thrust bearings 34a, 34b disposed on the axial direction front and rear sides of the turbine hub 31 may be omitted. In this case, the axial length of the starting device 11 can be shortened by a distance corresponding to the arrangement space of the thrust bearings 34a, 34b.

In the embodiment described above, the third working oil passage a3 forming a part of the radial direction oil passage portion of the working oil passage may overlap the front end surface side oil grooves 46 forming a part of the radial direction oil passage portion of the lubricating oil passage entirely in the axial direction.

In the embodiment described above, the radial direction oil passage portion may curve from a midway point on the first lubricating oil passage b1 of the lubricating oil passage, the oil hole in the radial direction oil passage portion may open onto the outer peripheral surface 13a of the input shaft 13 within the through hole 32, and the oil seals may be disposed to sandwich the oil hole from either side of the axial direction.

In the embodiment described above, the second working oil passage a2 and third working oil passage a3 forming a part of the radial direction oil passage portion of the working oil passage need not deviate from the oil grooves 46 forming a part of the radial direction oil passage portion of the lubricating oil passage in the circumferential direction centering on the axis L of the input shaft 13. In this case, an oil passage structure having an axial direction overlap can still be formed as long as the radial direction inner side site of the third working oil passage a3 is positioned further toward the radial direction inner side than the radial direction inner side site of the oil grooves 46.

In the embodiment described above, the starting device 11 is not limited to a device having a multi-plate type starting clutch 18. For example, the starting device 11 may be applied to a torque converter having a lockup clutch, the engagement state of which is switched on the basis of the pressure of working oil supplied to a clutch mechanism, or the like.

According to an exemplary aspect of the invention, the overall axial length of the device can be shortened by an amount corresponding to the overlap between the oil passages. Hence, even when a structure including oil passage portions in which a plurality of oil passages extend respectively in at least the radial direction is provided, an increase in axial direction length can be suppressed, making it possible to respond to a demand for a reduction in the size of the device.

According to an exemplary aspect of the invention, an oil passage structure in which the arrangement spaces of the radial direction oil passage portions of the respective oil passages overlap partially in the axial direction can be realized easily.

According to an exemplary aspect of the invention, the thrust bearing is structured to be capable of bearing an axial direction load applied to the output side member, and is therefore disposed between the axial direction end surface of the output side member and the inner surface of the housing. As a result, the overall axial length of the device increases by an amount corresponding to the axial direction thickness of the thrust bearing. However, this problem can be dealt with favorably by applying an oil passage structure in which a part of the radial direction oil passage portion of the lubricating oil passage for lubricating the thrust bearing overlaps the working oil passage partially in the axial direction.

According to an exemplary aspect of the invention, the position in which the radial direction oil passage portion of the working oil passage curves outwardly in the radial direction from the axial direction oil passage portion is away in an axial direction from the hydraulic chamber of the clutch mechanism, but the site of the radial direction oil passage portion that penetrates the output side member outwardly in the radial direction communicates linearly with the hydraulic chamber of the clutch mechanism. Therefore, the working oil can be supplied quickly.

According to an exemplary aspect of the invention, the radial direction oil passage portion of the working oil passage is formed in the output side member connected to the input shaft to be capable of rotating integrally therewith. Therefore, when the axial direction oil passage portion of the working oil passage communicates with the radial direction oil passage portion through the oil hole opening onto the outer peripheral surface part of the input shaft from a midway position in the axial direction of the input shaft, an inner diameter side opening of the oil passage (radial direction oil passage portion) in the output side member opposes the oil hole in the input shaft in the radial direction at all times. As a result, the pressure of the working oil supplied through the axial direction oil passage portion of the working oil passage can be supplied to the clutch mechanism through at least the radial direction oil passage portion of the working oil passage with a high degree of responsiveness.

What is claimed is:

1. A starting device, comprising:
   a housing connected to an output shaft of a drive source;
   an output side member that has a through hole into which an input shaft of a speed change mechanism can be inserted, the output side member being connected to the input shaft so as to be capable of rotating integrally therewith;
   a clutch mechanism that couples the housing to the output side member such that power can be transmitted therebetween through a clutch operation;
   a working oil passage that supplies working oil to a hydraulic chamber of the clutch mechanism from an oil pressure source side; and
   a lubricating oil passage including a supply oil passage that supplies lubricating oil to the housing from the oil pressure source side and a return oil passage for returning the lubricating oil to the oil pressure source side from the housing, wherein:
   the working oil passage and the lubricating oil passage are formed to overlap at least partially in an axial direction,
   the lubricating oil passage includes a first lubricating oil passage formed in the input shaft, a front end surface side oil groove that extends in a radial direction orthogonal to an axis of the input shaft, a rear end surface side oil groove that extends in the radial direction orthogonal to the axis of the input shaft, and a second lubricating oil passage formed on an outer peripheral surface of the input shaft,
   the first lubricating oil passage and the front end surface side oil groove form the supply oil passage,
   the rear end surface side oil groove and the second lubricating oil passage form the return oil passage,
   the working oil passage is formed in the input shaft and opening at the outer peripheral surface of the input shaft,
   the lubricating oil passage is formed in the input shaft and opening at a front end surface of the input shaft,
   part of the lubricating oil passage is between the output side member and a front cover of the housing and between the front end surface of the input shaft and the front cover,
   part of the working oil passage is in the output side member, is connected to the opening at the outer peripheral surface of the input shaft, and is inclined in an extension direction thereof such that a radial inner side part of the working oil passage at the output side member is closer to the front cover than a radial outer side part of the working oil passage at the output side member, and
   the radial inner side part of the working oil passage and the front end surface side oil groove of the lubricating oil passage axially overlap.

2. The starting device according to claim 1, wherein:
   the working oil passage includes a radial direction oil passage portion extending in at least the radial direction, and
   at least one of the front end surface side oil groove and the rear end surface side oil groove of the lubricating oil passage and the radial direction oil passage portion of the working oil passage deviate from each other in a circumferential direction centering on the axis of the input shaft.

3. The starting device according to claim 1, wherein
   a thrust bearing is interposed between an axial direction end surface of the output side member and an inner surface of the housing opposing the axial direction end surface, and
   part of the front end surface side oil groove of the lubricating oil passage is structured such that the thrust bearing can be lubricated by the lubricating oil flowing through the part of the front end surface side oil groove of the lubricating oil passage.

4. The starting device according to claim 1, wherein
   the working oil passage that is formed in the input shaft is an axial direction oil passage portion extending through an interior of the input shaft in the axial direction and the working oil passage includes a radial direction oil passage portion extending in at least the radial direction, and
   the radial direction oil passage portion of the working oil passage includes a site that curves outwardly in the radial direction from the axial direction oil passage portion such that, in a state where the output side member is connected to the input shaft, an oil hole opens onto the outer peripheral surface part of the input shaft opposing an inner peripheral surface of the through hole, and a site that penetrates the output side member outwardly in the radial direction from the inner peripheral surface of the through hole in the output side member to communicate linearly with the hydraulic chamber of the clutch mechanism.

5. The starting device according to claim 1, wherein:
   the working oil passage that is formed in the input shaft is a first working oil passage formed in the input shaft, and the working oil passage also includes a second working oil passage that curves outwardly in the radial direction from the first working oil passage, an oil reservoir chamber formed in a large diameter portion of the output side member, and a third working oil passage that penetrates the output side member outwardly in the radial direction so as to communicate with the hydraulic chamber,
   the first working oil passage forms an axial direction oil passage portion that extends in the axial direction, and
   the second working oil passage portion, the oil reservoir chamber and the third working oil passage portion form a radial direction oil passage portion that extends in the radial direction.

6. The starting device according to claim 1, wherein an oil seal is interposed between an inner peripheral surface of the output side member and the outer peripheral surface of the input shaft.

7. The starting device according to claim 6, wherein the oil seal includes a fitting member fitted into a large diameter portion of the output side member, and a seal lip fixed to the fitting member by a radial direction outside part forming an outer peripheral side thereof.

8. The starting device according to claim 7, wherein the oil seal also includes an annular spring member that biases a radial direction inside part forming an inner peripheral side of the seal lip against the outer peripheral surface of the input shaft.

9. The starting device according to claim 7, wherein a spline on the input shaft is formed at a position further toward a base end side of the input shaft than an arrangement position of the oil seal on the outer peripheral surface of the input shaft.

10. The starting device according to claim 7, wherein a radial direction inside part of the seal lip of the oil seal curves outwardly in the radial direction.

11. The starting device according to claim 1, wherein a peripheral edge of a tip end portion of the input shaft is chamfered to form a tapered surface that decreases in diameter toward a tip end side.

12. A starting device, comprising:
a housing connected to an output shaft of a drive source;
an output side member that has a through hole into which an input shaft of a speed change mechanism can be inserted, the output side member being connected to the input shaft so as to be capable of rotating integrally therewith;
a clutch mechanism that couples the housing to the output side member such that power can be transmitted therebetween through a clutch operation;
a working oil passage that supplies working oil to a hydraulic chamber of the clutch mechanism from an oil pressure source side; and
a lubricating oil passage including a supply oil passage that supplies lubricating oil to the housing from the oil pressure source side and a return oil passage for returning the lubricating oil to the oil pressure source side from the housing,
wherein part of the working oil passage and part of the lubricating oil passage are formed in a hub portion provided at a substantially central portion of a front cover of the housing, and
wherein the part of the working oil passage and the part of the lubricating oil passage are formed to overlap at least partially in an axial direction in the hub portion.

13. The starting device according to claim 12, wherein at least one of the supply oil passage and the return oil passage of the lubricating oil passage overlaps at least partially the working oil passage in the axial direction.

14. The starting device according to claim 12, wherein:
at least one of the supply oil passage and the return oil passage of the lubricating oil passage includes a radial direction oil passage portion extending in at least a radial direction,
the working oil passage includes a radial direction oil passage portion extending in at least the radial direction, and
the radial direction oil passage portion of the lubricating oil passage and the radial direction oil passage portion of the working oil passage deviate from each other in a circumferential direction centering on an axis of the input shaft.

15. The starting device according to claim 12, wherein:
at least one of the supply oil passage and the return oil passage of the lubricating oil passage includes a radial direction oil passage portion extending in at least a radial direction,
the working oil passage includes a radial direction oil passage portion extending in at least the radial direction,
a part of the radial direction oil passage portion of the lubricating oil passage extends in an orthogonal direction to the axis of the input shaft, and
a part of the radial direction oil passage portion of the working oil passage is inclined in an extension direction thereof such that a radial direction outer side site of the part of the radial direction oil passage portion is further away from the part of the radial direction oil passage portion of the lubricating oil passage in the axial direction than a radial direction inner side site.

16. The starting device according to claim 12, wherein
at least one of the supply oil passage and the return oil passage of the lubricating oil passage includes a radial direction oil passage portion extending, in at least a radial direction,
a thrust bearing is interposed between an axial direction end surface of the output side member and an inner surface of the housing opposing the axial direction end surface, and
a part of the radial direction oil passage portion of the lubricating oil passage is structured such that the thrust bearing can be lubricated by the lubricating oil flowing through the part of the radial direction oil passage portion of the lubricating oil passage.

17. The starting device according to claim 12, wherein an oil seal is interposed between an inner peripheral surface of the hub portion and an outer peripheral surface of the input shaft.

18. The starting device according to claim 17, wherein the oil seal includes a fitting member fitted into a large diameter portion of the hub portion, and a seal lip fixed to the fitting member by a radial direction outside part forming an outer peripheral side thereof.

19. The starting device according to claim 18, wherein the oil seal also includes an annular spring member that biases a radial direction inside part forming an inner peripheral side of the seal lip against the outer peripheral surface of the input shaft.

20. The starting device according to claim 18, wherein a spline on the input shaft is formed at a position further toward a base end side of the input shaft than an arrangement position of the oil seal on the outer peripheral surface of the input shaft.

21. The starting device according to claim 18, wherein a radial direction inside part of the seal lip of the oil seal curves outwardly in a radial direction.

22. The starting device according to claim 12, wherein a peripheral edge of a tip end portion of the input shaft is chamfered to form a tapered surface that decreases in diameter toward a tip end side.

23. The starting device according to claim 12, wherein the hub portion is part of a center piece, and the center piece and the front cover form a one-piece structure.

24. The starting device according to claim 12, wherein:
the hub portion includes an end surface that is on an opposite side of the front cover,
an opening of a radial inner side of the working oil passage at the hub portion is closer to the end surface of the hub portion than an opening of a radial inner side of the lubricating oil passage at the hub portion, and
an opening of a radial outer side of the lubricating oil passage at the hub portion is closer to the end surface of the hub portion than an opening of a radial outer side of the working oil passage at the hub portion.

* * * * *